US012606173B2

(12) United States Patent
Homma et al.

(10) Patent No.:  US 12,606,173 B2
(45) Date of Patent:  Apr. 21, 2026

(54) VEHICLE

(71) Applicant: SUBARU CORPORATION, Tokyo (JP)

(72) Inventors: Takuya Homma, Tokyo (JP); Tsukasa Mikuni, Tokyo (JP); Ryota Nakamura, Tokyo (JP); Junichi Motoyama, Tokyo (JP); Kazuhiro Hayakawa, Tokyo (JP); Yuta Goto, Tokyo (JP); Takuya Kaneta, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 132 days.

(21) Appl. No.: 18/347,853

(22) Filed: Jul. 6, 2023

(65) Prior Publication Data

US 2024/0034324 A1  Feb. 1, 2024

(30) Foreign Application Priority Data

Jul. 29, 2022  (JP) ................................. 2022-121290
May 18, 2023  (JP) ................................. 2023-082637

(51) Int. Cl.
B60W 30/182  (2020.01)
B60W 10/30  (2006.01)
B60W 60/00  (2020.01)
B62D 6/00  (2006.01)

(52) U.S. Cl.
CPC .......... B60W 30/182 (2013.01); B60W 10/30 (2013.01); B60W 60/0051 (2020.02)

(58) Field of Classification Search
CPC ............... B60W 30/182; B60W 10/30; B60W 60/0051; B60N 2/0244; B60Q 2800/10; B60Q 3/80; B62D 6/007

USPC ........................................................... 701/23
See application file for complete search history.

(56) References Cited

U.S. PATENT DOCUMENTS

| | | | | |
|---|---|---|---|---|
| 10,449,970 | B2 * | 10/2019 | Urano ............... | B60W 60/0059 |
| 10,464,575 | B2 * | 11/2019 | Abe .................. | B60W 50/0098 |
| 2015/0275563 | A1 * | 10/2015 | Fujimoto ................ | E05F 15/60 |
| | | | | 16/71 |
| 2015/0283998 | A1 * | 10/2015 | Lind .................. | B60W 60/0055 |
| | | | | 701/23 |
| 2016/0334788 | A1 * | 11/2016 | Park .................. | B60W 60/0053 |
| 2017/0205823 | A1 * | 7/2017 | Arndt ................ | B60W 60/0057 |
| 2017/0313314 | A1 * | 11/2017 | Sen ..................... | B60W 50/082 |
| 2017/0334454 | A1 * | 11/2017 | Abe .................. | B60W 50/0098 |

(Continued)

FOREIGN PATENT DOCUMENTS

| | | | | | |
|---|---|---|---|---|---|
| CN | 113071513 | A | * | 7/2021 | ............. B60K 35/00 |
| JP | 2016088334 | A | * | 5/2016 | |

(Continued)

OTHER PUBLICATIONS

KR20160021945.translate (Year: 2016).*

*Primary Examiner* — B M M Hannan
(74) *Attorney, Agent, or Firm* — Rimon P.C.

(57)  ABSTRACT

A vehicle includes a mode transition determination unit, and a controller. The mode transition determination unit is configured to make a determination as to whether or not one or both of a driving mode and a travel mode have made a transition. The controller is configured to vary a speed of a state change of interior equipment, based on a result of the determination by the mode transition determination unit.

8 Claims, 8 Drawing Sheets

(56) References Cited

U.S. PATENT DOCUMENTS

| | | | |
|---|---|---|---|
| 2018/0105184 A1* | 4/2018 | Urano | B60K 31/0008 |
| 2018/0208211 A1* | 7/2018 | Chiba | G08G 1/166 |
| 2018/0257698 A1* | 9/2018 | Ryne | G05B 13/0265 |
| 2019/0033860 A1 | 1/2019 | Okimoto et al. | |
| 2019/0111925 A1* | 4/2019 | Sata | B60W 10/30 |
| 2020/0047770 A1* | 2/2020 | Ozawa | G05D 1/0088 |
| 2020/0130546 A1* | 4/2020 | Foltin | B60N 2/6673 |
| 2020/0242924 A1* | 7/2020 | Publicover | G08G 1/087 |
| 2020/0269726 A1* | 8/2020 | Ohno | B60N 2/06 |
| 2020/0324669 A1* | 10/2020 | Amakawa | B60N 2/04 |
| 2020/0398868 A1* | 12/2020 | Horii | B60W 50/14 |
| 2021/0016805 A1* | 1/2021 | Oba | B60W 40/08 |
| 2021/0179145 A1* | 6/2021 | Yu | B60W 60/0053 |
| 2021/0206395 A1* | 7/2021 | Guo | B60W 50/082 |
| 2021/0213997 A1* | 7/2021 | Watanabe | G05D 3/20 |
| 2022/0203991 A1* | 6/2022 | Yamabe | B60W 10/20 |
| 2023/0026720 A1* | 1/2023 | Decker | B60W 60/0059 |
| 2023/0417321 A1* | 12/2023 | Su | F16H 59/74 |
| 2024/0051583 A1* | 2/2024 | Komori | B60W 10/184 |

FOREIGN PATENT DOCUMENTS

| | | | | | |
|---|---|---|---|---|---|
| JP | 6627810 | B2 * | 1/2020 | | B60W 50/12 |
| JP | 6640325 | B2 | 2/2020 | | |
| JP | 2021047633 | A * | 3/2021 | | B60W 40/08 |
| JP | 2022524168 | A * | 4/2022 | | |
| KR | 20210044329 | A * | 4/2021 | | |
| WO | WO-2018061154 | A1 * | 4/2018 | | B60K 37/06 |

* cited by examiner

VEHICLE

CROSS-REFERENCE TO RELATED APPLICATIONS

The present application claims priority from Japanese Patent Application No. 2022-121290 filed on Jul. 29, 2022 and Japanese Patent Application No. 2023-082637 filed on May 18, 2023, the entire contents of which are hereby incorporated by reference.

BACKGROUND

The disclosure relates to a vehicle.

There has been known techniques of changing luminance or an illumination color of interior lighting in accordance with a driving mode such as an automated driving mode or a manual driving mode, to notify an occupant of switching of the driving mode.

One of the techniques of this kind discloses a vehicle control system including an automated driving control unit and an environment control unit. The automated driving control unit carries out a first driving mode. The first driving mode includes automatically controlling one or both of acceleration and deceleration of the vehicle, and steering of the vehicle. When the automated driving control unit finishes carrying out the first driving mode and shifts to a second driving mode having a lower degree of the automated driving than the first driving mode, the environment control unit controls interior lighting in the vehicle to make environment in the vehicle suitable for the second driving mode. When the automated driving control unit finishes carrying out the first driving mode at a scheduled end point of the first driving mode, and shifts to the second driving mode having the lower degree of the automated driving than the first driving mode, the environment control unit starts to control the interior lighting in the vehicle at earlier timing than timing of arrival at the scheduled end point. Thus, the environment control unit makes the environment in the vehicle suitable for the second driving mode at the scheduled end point. For example, reference is made to Japanese Patent No. 6640325.

SUMMARY

An aspect of the disclosure provides a vehicle including a mode transition determination unit, and a controller. The mode transition determination unit is configured to make a determination as to whether or not one or both of a driving mode and a travel mode have made a transition. The controller is configured to vary a speed of a state change of interior equipment, based on a result of the determination by the mode transition determination unit.

An aspect of the disclosure provides a vehicle including circuitry. The circuitry is configured to: make a determination as to whether or not one or both of a driving mode and a travel mode have made a transition; and vary a speed of a state change of interior equipment, based on a result of the determination.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
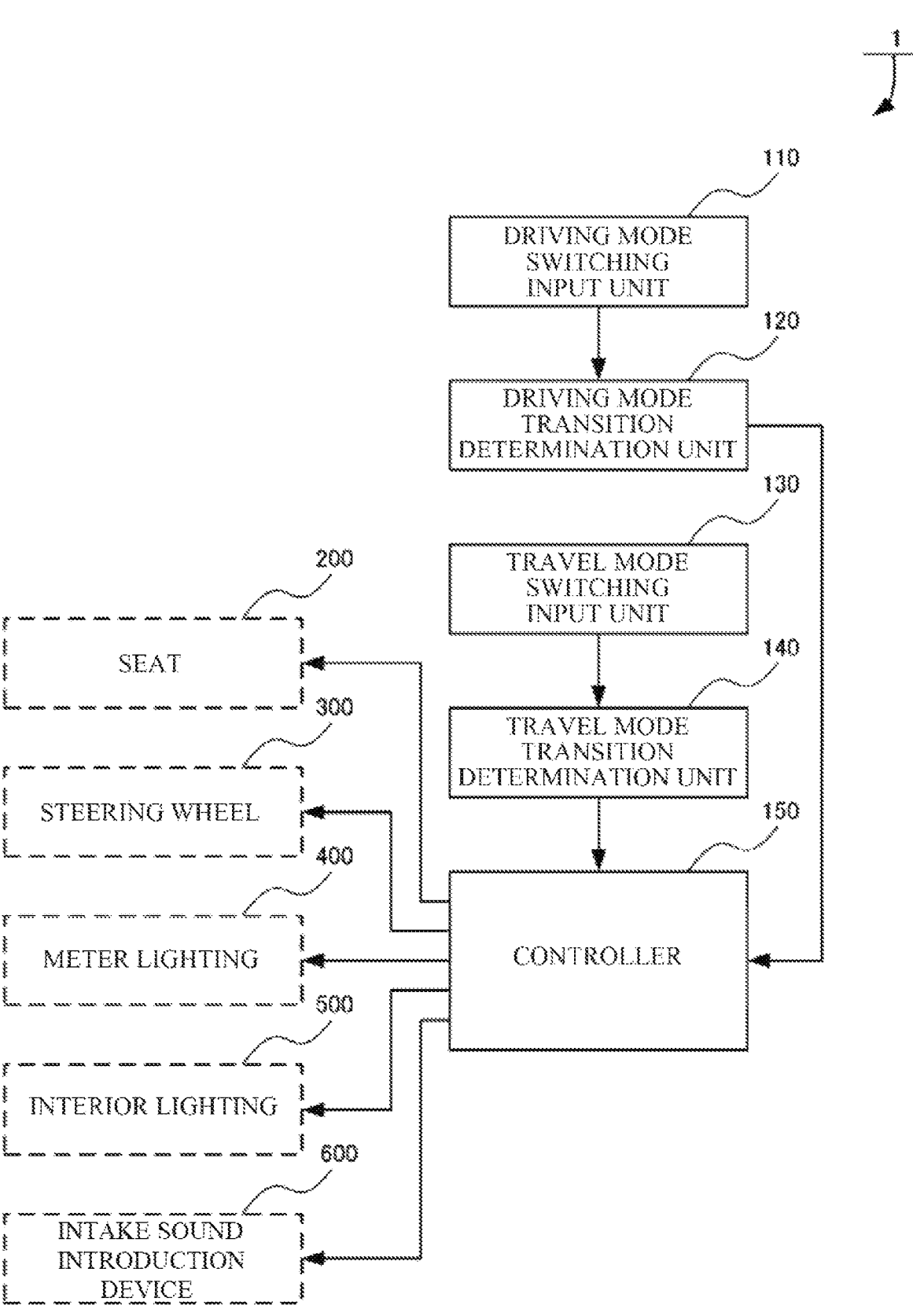
FIG. 1 is a block diagram illustrating a configuration of a vehicle according to an embodiment of the disclosure.

Besides Japanese Patent No. 6640325 mentioned above, there has been other methods of notifying an occupant of switching of a driving mode or a travel mode. Such methods include making a change in, for example, a driving position, contents to be displayed on a meter, an illumination color of interior lighting, and an exhaust sound. None of these methods, however, has varied a speed of the change in accordance with the switching of the modes, in addition to the change in the driving position, the contents to be displayed on the meter, the illumination color of the interior lighting, and the exhaust sound. Thus, these methods still have a room for improvement in terms of recognizability and spatial presentation of a cabin.

It is desirable to provide a vehicle that makes it possible to enhance an occupant's awareness of switching of a driving mode and a travel mode, and to enhance spatial presentation of a cabin.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A vehicle 1 according to an embodiment is described with reference to FIGS. 1 to 8.

<Configuration of Vehicle 1>

As illustrated in FIG. 1, the vehicle 1 according to this embodiment may include, for example, a driving mode switching input unit 110, a driving mode transition determination unit 120, a travel mode switching input unit 130, a travel mode transition determination unit 140, and a controller 150.

The driving mode switching input unit 110 may be supplied with an instruction to switch a driving mode. The instruction is given by an occupant.

The driving mode switching input unit 110 may output a switching signal indicating switching of the driving mode by the occupant, to the driving mode transition determination unit 120 described below.

The driving mode transition determination unit 120 may determine whether or not the driving mode has made a transition, based on the switching signal obtained from the driving mode switching input unit 110. The switching signal indicates the switching of the driving mode by the occupant.

In one example, the driving mode transition determination unit 120 may determine that the driving mode has made a transition to an automated driving mode, based on the switching signal that causes switching of the driving mode to the automated driving mode. The driving mode transition determination unit 120 may determine that the driving mode has made a transition to a manual driving mode, based on the switching signal that causes switching of the driving mode to the manual driving mode.

The travel mode switching input unit 130 may be supplied with an instruction to switch a travel mode. The instruction is given by the occupant.

The travel mode switching input unit 130 may output a switching signal indicating switching of the travel mode by the occupant, to the travel mode transition determination unit 140 described below.

The travel mode transition determination unit 140 may determine whether or not the travel mode has made a transition, based on the switching signal obtained from the travel mode switching input unit 130. The switching signal indicates the switching of the travel mode by the occupant.

In one example, the travel mode transition determination unit 140 may determine that the travel mode has made a transition to a relaxation mode, based on the switching signal that causes the switching of the traveling mode to the relaxation mode. The travel mode transition determination unit 140 may determine that the travel mode has made a transition to a sports mode, based on the switching signal that causes the switching of the travel mode to the sports mode.

Moreover, the travel mode transition determination unit 140 may determine that the travel mode has made a transition to a normal mode, based on the switching signal that causes switching the travel mode to the normal mode.

In one embodiment of the disclosure, the driving mode transition determination unit 120 and the travel mode transition determination unit 140 may collectively serve as a "mode transition determination unit".

The controller 150 may control operation of the entire vehicle 1 in accordance with a control program held in, for example, an unillustrated read only memory (ROM).

In this embodiment, the controller 150 varies a speed of a state change of interior equipment, based on a determination result by the driving mode transition determination unit 120 or the travel mode transition determination unit 140.

Non-limiting examples of the interior equipment to be controlled by the controller 150 may include a seat 200, meter lighting 400, a steering wheel 300, and interior lighting 500.

In one example, when determining that the driving mode has made the transition to the automated driving mode, based on the determination result by the driving mode transition determination unit 120, the controller 150 may make a control to slowly change a position of the steering wheel 300, to slowly change an angle of a seatback of the seat 200, and/or to slowly lower illuminance of the interior lighting 500.

Moreover, for example, when determining that the driving mode has made the transition to the manual driving mode, based on the determination result by the driving mode transition determination unit 120, the controller 150 may make a control to quickly change the position of the steering wheel 300, to quickly change the angle of the seatback of the seat 200, and/or to quickly raise the illuminance of the interior lighting 500.

Furthermore, for example, when determining that the travel mode has made the transition to the relaxation mode, based on the determination result by the travel mode transition determination unit 140, the controller 150 may make the control to slowly change the position of the steering wheel 300, to slowly change the angle of the seatback of the seat 200, and slowly lower the illuminance of the interior lighting 500.

In addition, for example, when determining that the travel mode has made the transition to the sports mode, based on the determination result by the travel mode transition determination unit 140, the controller 150 may make the control to quickly change the position of the steering wheel 300, to quickly change the angle of the seatback of the seat 200, and to quickly raise the illuminance of the interior lighting 500.

<Processing in Vehicle 1>

Processing in the vehicle 1 according to this embodiment is described with reference to FIGS. 2 to 8.

<Processing when Driving Mode has Made Transition, Part 1>

Figure 2:
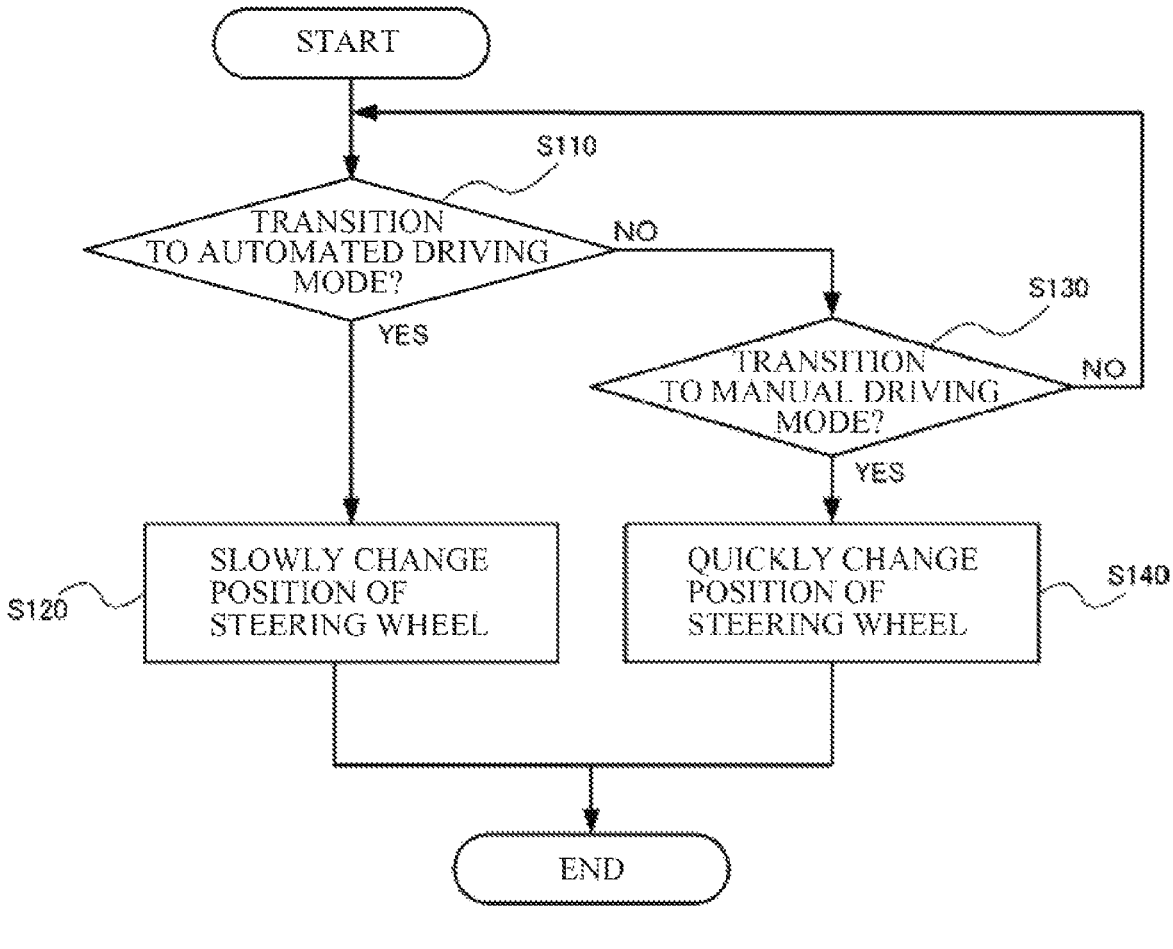
FIG. 2 is a flowchart of processing when a driving mode has made a transition, in the vehicle according to the embodiment of the disclosure.

As illustrated in FIG. 2, the controller 150 may determine whether or not the driving mode has made the transition to the automated driving mode, based on the determination result by the driving mode transition determination unit 120 (step S110).

When the controller 150 determines that the driving mode has made the transition to the automated driving mode ("YES" in step S110) based on the determination result by the driving mode transition determination unit 120, the controller 150 may slowly change the position of the steering wheel 300 (step S120) and end the processing.

When the controller 150 determines that the driving mode has not made the transition to the automated driving mode ("NO" in step S110) based on the determination result by the driving mode transition determination unit 120, the controller 150 may determine whether or not the driving mode has made the transition to the manual driving mode, based on the determination result by the driving mode transition determination unit 120 (step S130).

When the controller 150 determines that the driving mode has made the transition to the manual driving mode ("YES" in step S130) based on the determination result by the driving mode transition determination unit 120, the controller 150 may quickly change the position of the steering wheel 300 (step S140) and end the processing.

When the controller 150 determines that the driving mode has not made the transition to the manual driving mode ("NO" in step S130) based on the determination result by the driving mode transition determination unit 120, the controller 150 may determine that the driving mode has not made the transition to the automated driving mode nor the manual driving mode. In other words, the controller 150 may determine that the driving mode is maintained, and cause the flow to return to step S110.

<Processing when Driving Mode has Made Transition, Part 2>

Figure 3:
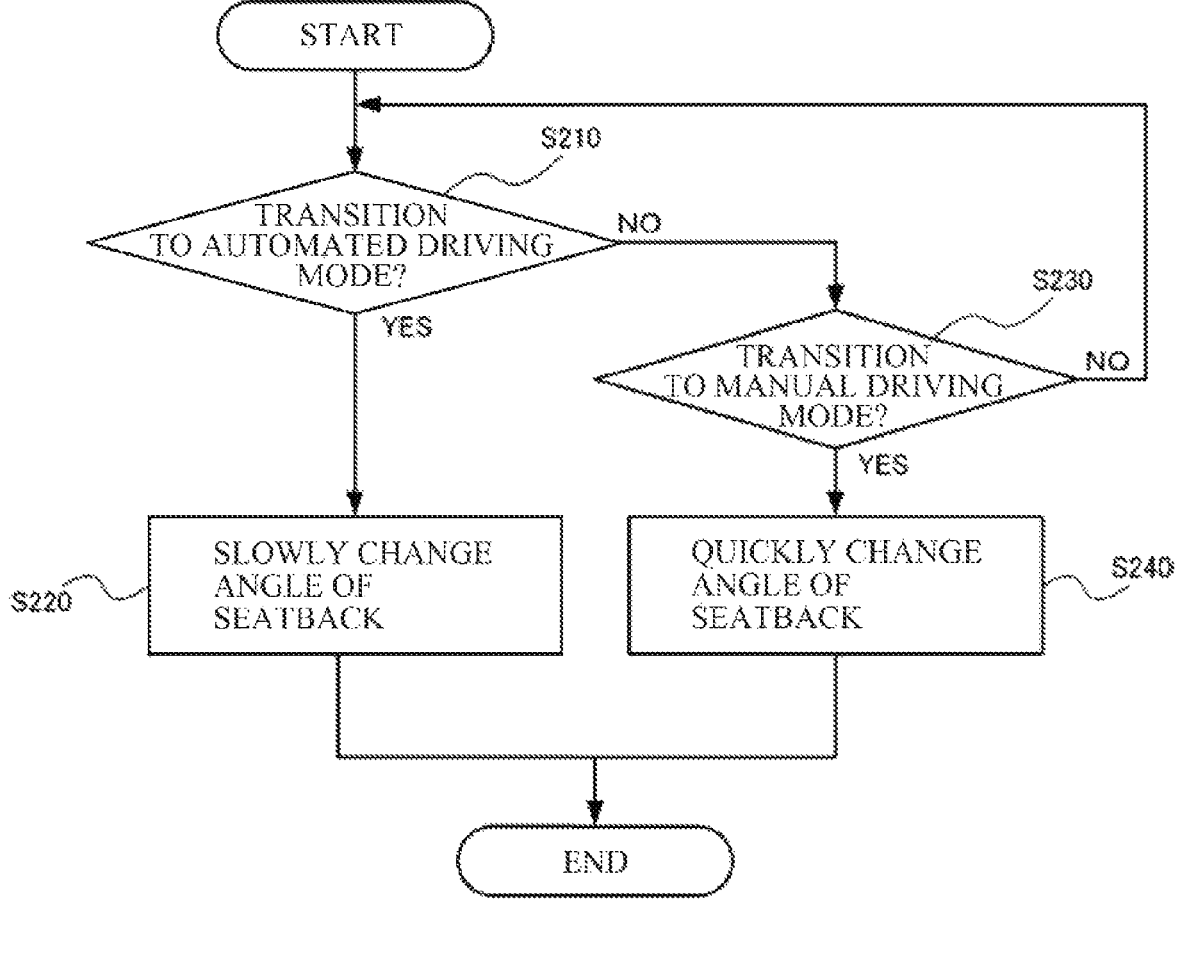
FIG. 3 is a flowchart of processing when the driving mode has made a transition, in the vehicle according to the embodiment of the disclosure.

As illustrated in FIG. 3, the controller 150 may determine whether or not the driving mode has made the transition to the automated driving mode, based on the determination result by the driving mode transition determination unit 120 (step S210).

When the controller 150 determines that the driving mode has made the transition to the automated driving mode ("YES" in step S210) based on the determination result by the driving mode transition determination unit 120, the controller 150 may slowly change the angle of the seatback of the seat 200 (step S220) and end the processing.

When the controller 150 determines that the driving mode has not made the transition to the automated driving mode ("NO" in step S210) based on the determination result by the driving mode transition determination unit 120, the controller 150 may determine whether or not the driving mode has made the transition to the manual driving mode, based on the determination result by the driving mode transition determination unit 120 (step S230).

When the controller 150 determines that the driving mode has made the transition to the manual driving mode ("YES" in step S230) based on the determination result by the driving mode transition determination unit 120, the controller 150 may quickly change the angle of the seatback of the seat 200 (step S240) and end the processing.

When the controller 150 determines that the driving mode has not made the transition to the manual driving mode ("NO" in step S230) based on the determination result by the driving mode transition determination unit 120, the controller 150 may determine that the driving mode has not made the transition to the automated driving mode nor the manual driving mode. In other words, the controller 150 may determine that the driving mode is maintained, and cause the flow to return to step S210.

<Processing when Driving Mode has Made Transition, Part 3>

Figure 4:
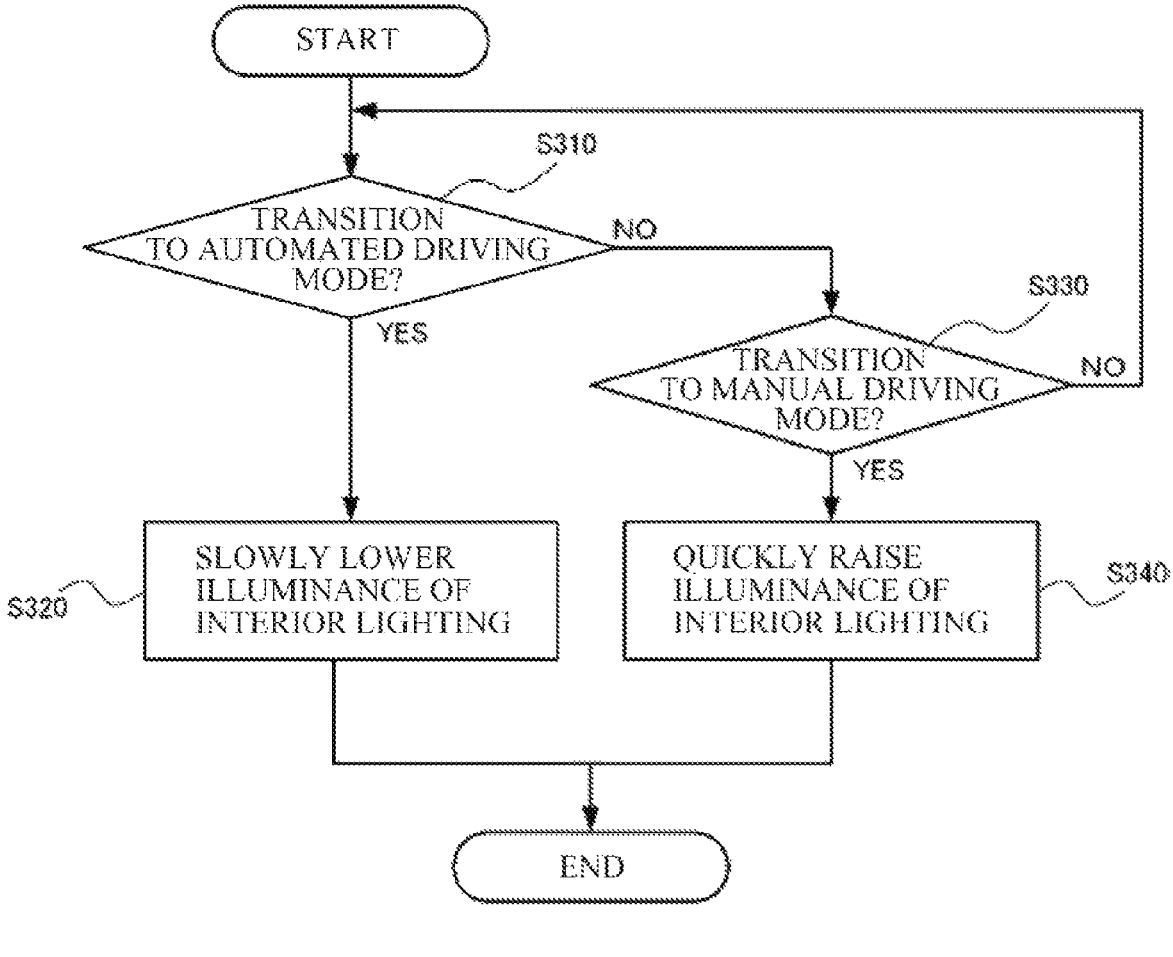
FIG. 4 is a flowchart of processing when the driving mode has made a transition, in the vehicle according to the embodiment of the disclosure.

As illustrated in FIG. 4, the controller 150 may determine whether or not the driving mode has made the transition to the automated driving mode, based on the determination result by the driving mode transition determination unit 120 (step S310).

When the controller 150 determines that the driving mode has made the transition to the automated driving mode ("YES" in step S310) based on the determination result by the driving mode transition determination unit 120, the controller 150 may slowly lower the illuminance of the interior lighting 500 (step S320) and end the processing.

When the controller 150 determines that the driving mode has not made the transition to the automated driving mode ("NO" in step S310) based on the determination result by the driving mode transition determination unit 120, the controller 150 may determine whether or not the driving mode has made the transition to the manual driving mode, based on the determination result by the driving mode transition determination unit 120 (step S330).

When the controller 150 determines that the driving mode has made the transition to the manual driving mode ("YES" in step S330) based on the determination result by the driving mode transition determination unit 120, the controller 150 may quickly raise the illuminance of the interior lighting 500 (step S340) and end the processing.

When the controller 150 determines that the driving mode has not made the transition to the manual driving mode ("NO" in step S330) based on the determination result by the driving mode transition determination unit 120, the controller 150 may determine that the driving mode has not made the transition to the automated driving mode nor the manual driving mode. In other words, the controller 150 may determine that the driving mode is maintained, and cause the flow to return to step S310.

<Processing when Travel Mode has Made Transition, Part 1>

Figure 5:
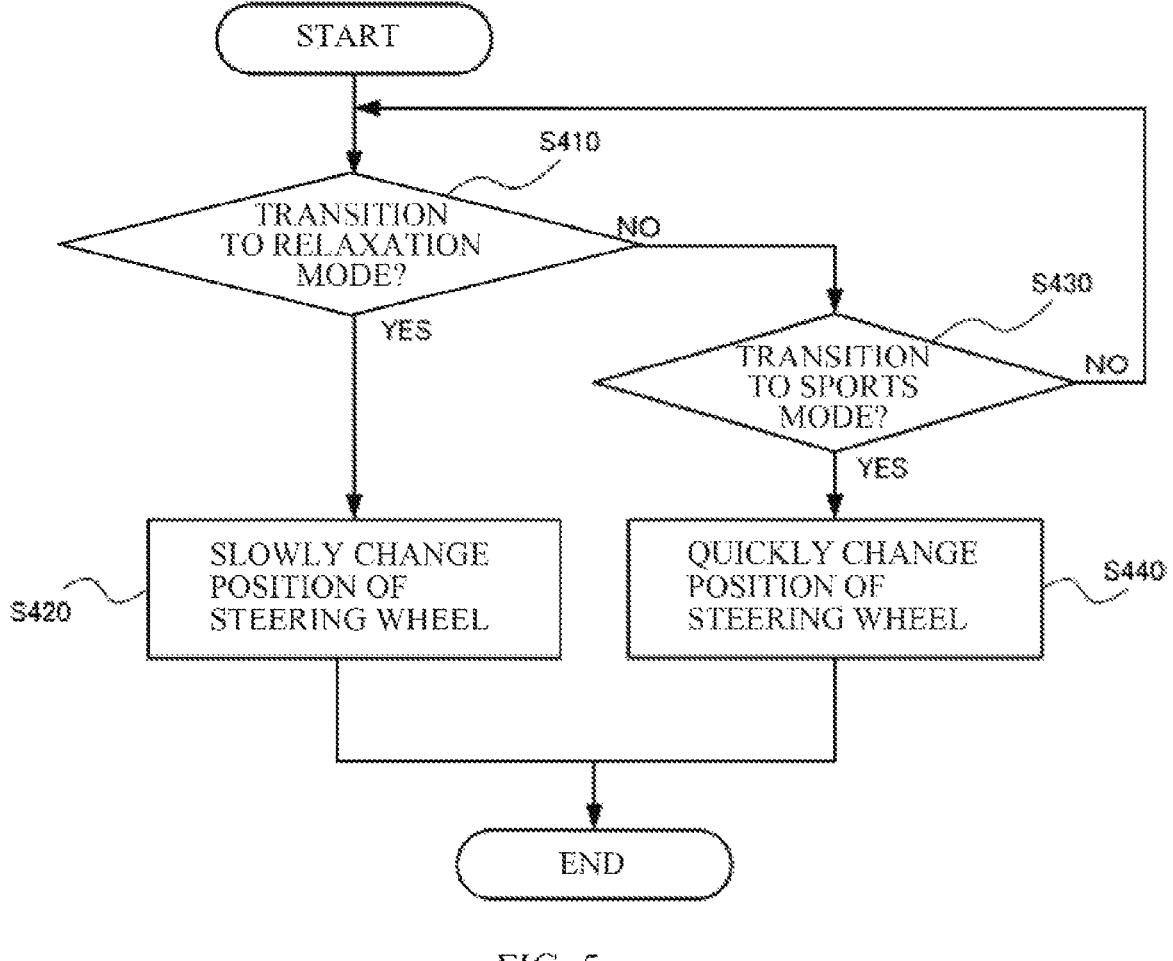
FIG. 5 is a flowchart of processing when a travel mode has made a transition, in the vehicle according to the embodiment of the disclosure.

As illustrated in FIG. 5, the controller 150 may determine whether or not the travel mode has made the transition to the relaxation mode, based on the determination result by the travel mode transition determination unit 140 (step S410).

When the controller 150 determines that the travel mode has made the transition to the relaxation mode ("YES" in step S410) based on the determination result by the travel mode transition determination unit 140, the controller 150 may slowly change the position of the steering wheel 300 (step S420) and end the processing.

When the controller 150 determines that the travel mode has not made the transition to the relaxation mode ("NO" in step S410) based on the determination result by the travel mode transition determination unit 140, the controller 150 may determine whether or not the travel mode has made the transition to the sports mode, based on the determination result of the travel mode transition determination unit 140 (step S430).

When the controller 150 determines that the travel mode has made the transition to the sports mode ("YES" in step S430) based on the determination result by the travel mode transition determination unit 140, the controller 150 may quickly change the position of the steering wheel 300 (step S440) and end the processing.

When the controller 150 determines that the travel mode has not made the transition to the sports mode ("NO" in step S430) based on the determination result by the travel mode transition determination unit 140, the controller 150 may determine that the travel mode has not made the transition to the relaxation mode nor the sports mode. In other words, the controller 150 may determine that the travel mode is maintained, and cause the flow to return to step S410.

<Processing when Travel Mode has Made Transition, Part 2>

Figure 6:
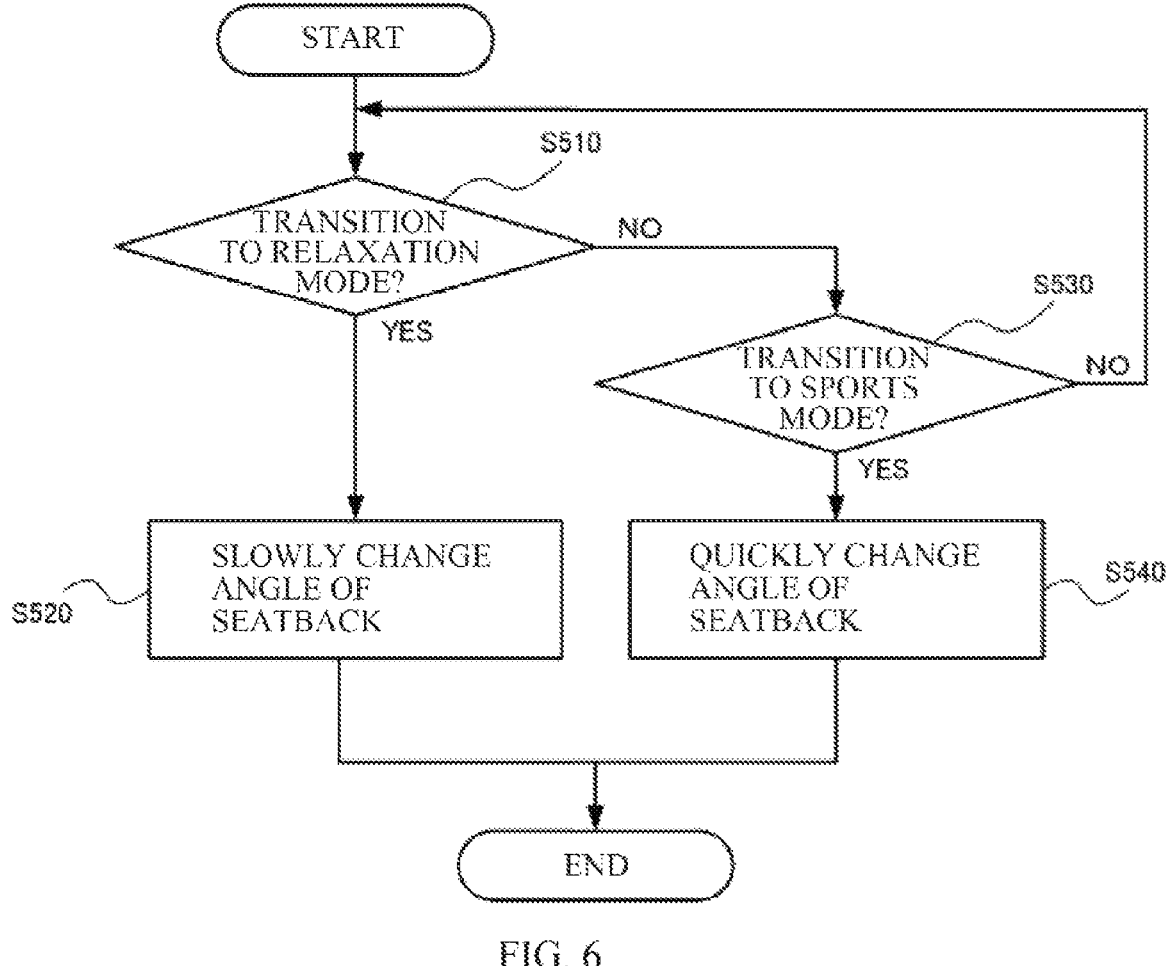
FIG. 6 is a flowchart of processing when the travel mode has made a transition, in the vehicle according to the embodiment of the disclosure.

As illustrated in FIG. 6, the controller 150 may determine whether or not the travel mode has made the transition to the relaxation mode, based on the determination result by the travel mode transition determination unit 140 (step S510).

When the controller 150 determines that the travel mode has made the transition to the relaxation mode ("YES" in step S510) based on the determination result by the travel mode transition determination unit 140, the controller 150 may slowly change the angle of the seatback of the seat 200 (step S520) and end the processing.

When the controller 150 determines that the travel mode has not made the transition to the relaxation mode ("NO" in step S510) based on the determination result by the travel mode transition determination unit 140, the controller 150 may determine whether or not the travel mode has made the transition to the sports mode, based on the determination result by the travel mode transition determination unit 140 (step S530).

When the controller 150 determines that the travel mode has made the transition to the sports mode ("YES" in step S530) based on the determination result by the travel mode transition determination unit 140, the controller 150 may quickly change the angle of the seatback of the seat 200 (step S540) and end the processing.

When the controller 150 determines that the travel mode has not made the transition to the sports mode ("NO" in step S530) based on the determination result by the travel mode transition determination unit 140, the controller 150 may determine that the travel mode has not made the transition to the relaxation mode nor the sports mode. In other words, the controller 150 may determine that the travel mode is maintained, and cause the flow to return to step S510.

<Processing when Travel Mode has Made Transition, Part 3>

Figure 7:
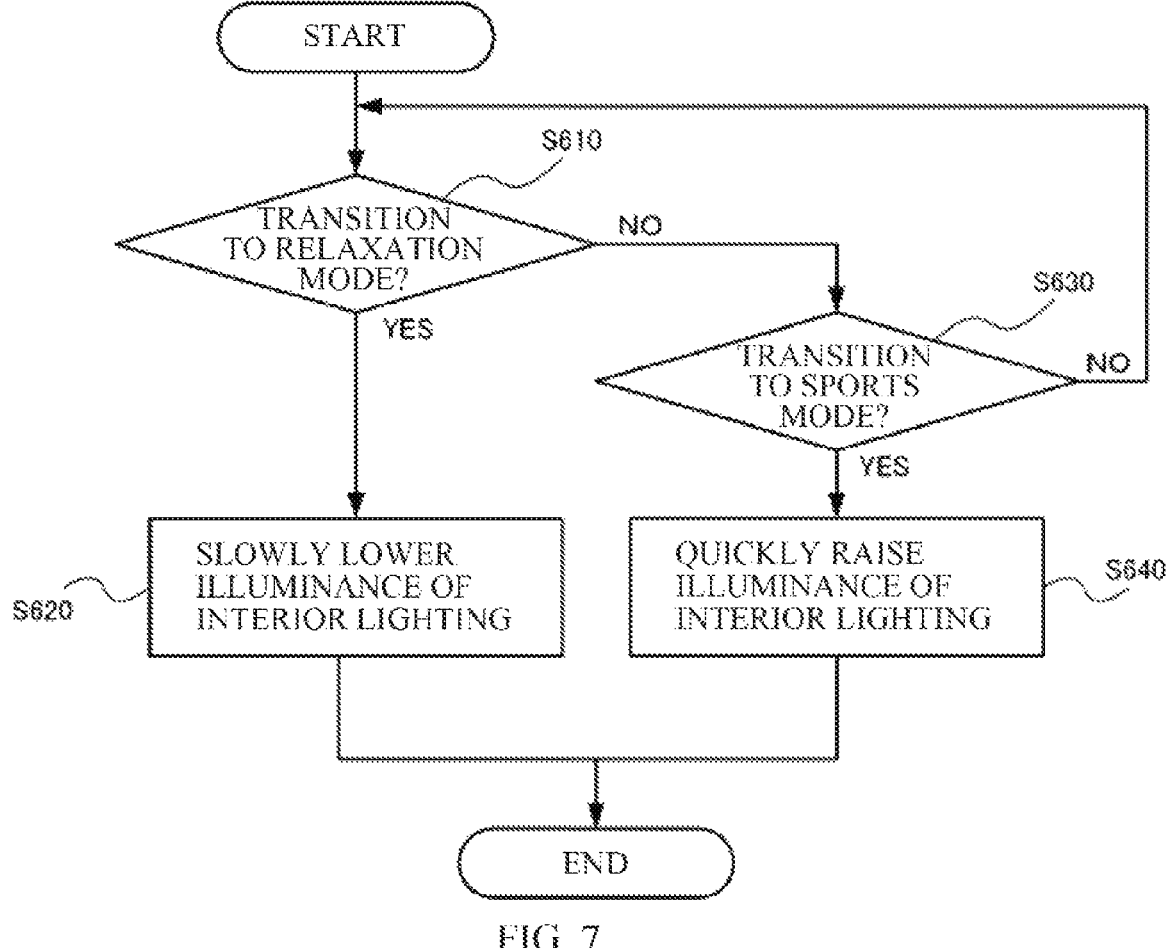
FIG. 7 is a flowchart of processing when the travel mode has made a transition, in the vehicle according to the embodiment of the disclosure.

As illustrated in FIG. 7, the controller 150 may determine whether or not the travel mode has made the transition to the relaxation mode, based on the determination result by the travel mode transition determination unit 140 (step S610).

When the controller 150 determines that the travel mode has made the transition to the relaxation mode ("YES" in step S610) based on the determination result by the travel mode transition determination unit 140, the controller 150 may slowly lower the illuminance of the interior lighting 500 (step S620) and end the processing.

When the controller 150 determines that the travel mode has not made the transition to the relaxation mode ("NO" in step S610) based on the determination result by the travel mode transition determination unit 140, the controller 150 may determine whether or not the travel mode has made the transition to the sports mode, based on the determination result by the travel mode transition determination unit 140 (step S630).

When the controller 150 determines that the travel mode has made the transition to the sports mode ("YES" in step S630) based on the determination result by the travel mode transition determination unit 140, the controller 150 may quickly raise the illuminance of the interior lighting 500 (step S640) and end the processing.

When the controller 150 determines that the travel mode has not made the transition to the sports mode ("NO" in step S630) based on the determination result by the travel mode transition determination unit 140, the controller 150 may determine that the travel mode has not made the transition to the relaxation mode nor the sports mode. In other words, the controller 150 may determine that the travel mode is maintained, and cause the flow to return to step S610.

<Processing when Travel Mode has Made Transition, Part 4>

Figure 8:
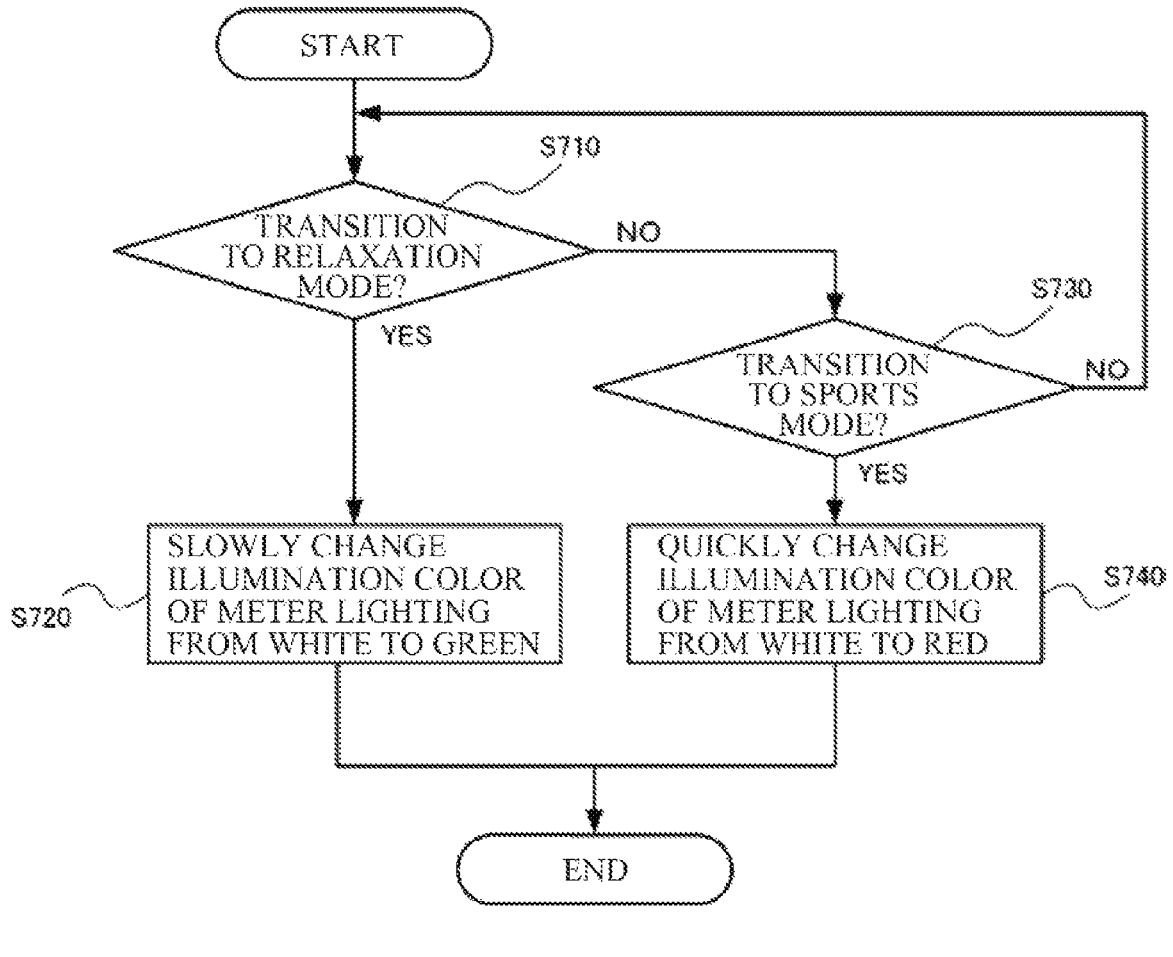
FIG. 8 is a flowchart of processing when the travel mode has made a transition, in the vehicle according to the embodiment of the disclosure.

As illustrated in FIG. 8, the controller 150 may determine whether or not the travel mode has made the transition to the relaxation mode, based on the determination result by the travel mode transition determination unit 140 (step S710).

When the controller 150 determines that the travel mode has made the transition to the relaxation mode ("YES" in step S710) based on the determination result by the travel mode transition determination unit 140, the controller 150 may slowly change an illumination color of meter lighting 400 from white to green (step S720) and end the processing.

When the controller 150 determines that the travel mode has not made the transition to the relaxation mode ("NO" in step S710) based on the determination result by the travel mode transition determination unit 140, the controller 150 may determine whether or not the travel mode has made the transition to the sports mode, based on the determination result by the travel mode transition determination unit 140 (step S730).

When the controller 150 determines that the travel mode has made the transition to the sports mode ("YES" in step S730) based on the determination result by the travel mode transition determination unit 140, the controller 150 may quickly change the illumination color of the meter lighting 400 from white to red (step S740) and end the processing.

When the controller 150 determines that the travel mode has not made the transition to the sports mode ("NO" in step S730) based on the determination result by the travel mode transition determination unit 140, the controller 150 may determine that the travel mode has not made the transition to the relaxation mode nor the sports mode. In other words, the controller 150 may determine that the travel mode is maintained, and cause the flow to return to step S710.

<Workings and Effects>

As described, the controller 150 of the vehicle 1 according to this embodiment varies the speed of the state change of the interior equipment, based on the determination result by the driving mode transition determination unit 120 or the travel mode transition determination unit 140.

That is, for example, when determining that the driving mode has made the transition to the automated driving mode, based on the determination result by the driving mode transition determination unit 120, the controller 150 may make the control to slowly change the position of the steering wheel 300, to slowly change the angle of the seatback of the seat 200, and/or to slowly lower the illuminance of the interior lighting 500.

Moreover, for example, when determining that the driving mode has made the transition to the manual driving mode, based on the determination result by the driving mode transition determination unit 120, the controller 150 may make the control to quickly change the position of the steering wheel 300, to quickly change the angle of the seatback of the seat 200, and/or to quickly raise the illuminance of the interior lighting 500.

Furthermore, for example, when determining that the travel mode has made the transition to the relaxation mode, based on the determination result by the travel mode transition determination unit 140, the controller 150 may make the control to slowly change the position of the steering wheel 300, to slowly change the angle of the seatback of the seat 200, and/or to slowly lower the illuminance of the interior lighting 500.

In addition, for example, when determining that the travel mode has made the transition to the sports mode, based on the determination result by the travel mode transition determination unit 140, the controller 150 may make the control to quickly change the position of the steering wheel 300, to quickly change the angle of the seatback of the seat 200, and/or to quickly raise the illuminance of the interior lighting 500.

Hence, it is possible to enhance the occupant's awareness of the switching of the driving mode and the travel mode, and enhance the spatial presentation in the cabin.

Moreover, in the vehicle 1 according to this embodiment, the driving mode may include the automated driving mode and the manual driving mode. The travel mode may include the normal mode, the sports mode, and the relaxation mode. The interior equipment may include one or more of the seat 200, the meter lighting 400, the steering wheel 300, and the interior lighting 500.

That is, the driving mode transition determination unit 120 may determine whether or not the driving mode has made the transition to the automated driving mode or the manual driving mode. The travel mode transition determination unit 140 may determine whether or not the travel mode has made the transition to the sports mode or the relaxation mode. The controller 150 may vary the speed of the state change of the interior equipment, based on the determination result by the driving mode transition determination unit 120 or the travel mode transition determination unit 140.

Hence, it is possible to enhance the occupant's awareness of the switching of the driving mode and the travel mode, and enhance the spatial presentation of the cabin.

Furthermore, in the vehicle 1 according to this embodiment, when the travel mode has made the transition to the sports mode, the controller 150 may control one or both of the angle of the seatback of the seat 200 and the position of the steering wheel 300 to switch at a higher speed than a normal speed. When the travel mode has made the transition to the relaxation mode, the controller 150 may control one or both of the angle of the seatback of the seat 200 and the position of the steering wheel 300 to switch at a lower speed than the normal speed.

Thus, when the travel mode has made the transition to the sports mode, controlling one or both of the angle of the seatback of the seat 200 and the position of the steering wheel 300 to switch at the higher speed than the normal speed makes it possible to allow the occupant to clearly recognize the switching of the travel mode to the sports mode, and to enhance the spatial presentation of the cabin. When the travel mode has made the transition to the relaxation mode, controlling one or both of the angle of the seatback of the seat 200 and the position of the steering wheel 300 to switch at the lower speed than the normal speed makes it possible to allow the occupant to clearly recognize the switching of the travel mode to the relaxation mode, and to enhance the spatial presentation of the cabin.

Modification Example 1

In this embodiment, an example is given where the controller 150 varies the speed of the state change of the interior equipment, based on the determination result by the driving mode transition determination unit 120 or the travel mode transition determination unit 140. However, in addition to the processing described above, for example, when the travel mode has made the transition to the sports mode, display of a drive position may be switched quickly, and when the travel mode has made the transition to the relaxation mode, the display of the drive position may be switched slowly. Making such a control makes it possible to further the occupant's awareness of the switching of the driving mode and the travel mode.

Modification Example 2

Moreover, for example, when the travel mode makes the transition to the sport mode, in addition to the control described above, a ring portion of the meter may be displayed in red or alternatively, the ring portion of the meter may serve as ambient lighting. In addition, an intake sound introduction device may be activated.

Carrying out such a control makes it possible to further the occupant's awareness of the switching of the driving mode and the travel mode, and to enhance the spatial presentation of the cabin.

In the forgoing embodiments, a case is described where the vehicle 1 includes the driving mode transition determination unit 120 and the travel mode transition determination unit 140, to determine whether or not both the driving mode and the travel mode have made the transition. However, the disclosure is applicable to a case where the vehicle 1 includes solely the driving mode transition determination unit 120, to determine whether or not the driving mode has made the transition, or alternatively, the disclosure is applicable to a case where the vehicle 1 includes solely the travel mode transition determination unit 140, to determine whether or not the travel mode has made the transition.

In the forgoing embodiments, an example is given where the processing when the driving mode has made the transition, Part 1, Part 2, and Part 3 in FIGS. 2 to 4 are independently carried out. However, the processing when the driving mode has made the transition, Part 1, Part 2, and Part 3 in FIGS. 2 to 4 may be carried out in any combination.

In the forgoing embodiments, an example is given where the processing when the travel mode has made the transition, Part 1, Part 2, Part 3, and Part 4 in FIGS. 5 to 8 are independently carried out. However, the processing when the travel mode has made the transition, Part 1, Part 2, Part 3, and Part 4 in FIGS. 5 to 8 may be carried out in any combination.

In some embodiments, it is possible to implement the vehicle 1 of the example embodiment of the disclosure by recording the process to be executed by the controller 150 on a non-transitory recording medium readable by a computer system, and causing the computer system to load the program recorded on the non-transitory recording medium onto the controller 150 to execute the program. The computer system as used herein may encompass an operating system (OS) and hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The driving mode switching input unit 110, the driving mode transition determination unit 120, the travel mode switching input unit 130, the travel mode transition determination unit 140, and the controller 150 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving mode switching input unit 110, the driving mode transition determination unit 120, the travel mode switching input unit 130, the travel mode transition determination unit 140, and the controller 150. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving mode switching input unit 110, the driving mode transition determination unit 120, the travel mode switching input unit 130, the travel mode transition determination unit 140, and the controller 150 illustrated in FIG. 1.

The invention claimed is:

1. A vehicle having (1) driving modes comprising an automated driving mode and a manual driving mode and (2) travel modes comprising a normal mode and a sports mode, the vehicle comprising:

interior equipment configured to change a state in accordance with a selected one of the driving modes or a selected one of the travel modes;

a mode transition determination unit configured to determine whether a transition has occurred from one of the driving modes to another of the driving modes, from one of the travel modes to another of the travel modes, or from both; and a controller configured to:

in response to the mode transition determination unit determining that the transition has occurred, set a post-transition state of the interior equipment associated with a post-transition driving mode, a post-transition travel mode, or both, and set a transition speed based on the post-transition driving mode, the post-transition travel mode, or both; and control the interior equipment to transition from a current state to the set post-transition state at the set transition speed;

wherein the travel modes further comprise a mode other than the normal mode and the sports mode, the interior equipment comprises a seat, lighting, and a steering wheel which are provided in a vehicle interior, and the controller is further configured to:

control the interior equipment to change, at a higher speed than a normal speed, an angle of a seatback of the seat, a position of the steering wheel relative to the vehicle, and a level of illuminance of the lighting upon determining that the travel mode has transitioned from the normal mode to the sports mode; and control the interior equipment to change, at a lower speed than the normal speed, the angle of the seatback of the seat, the position of the steering wheel, and the level of illuminance of the lighting, upon determining that the travel mode has transitioned from the normal mode to the mode other than the normal mode and the sports mode.

2. The vehicle according to claim 1, wherein the travel modes further comprise a relaxation mode, and the interior equipment comprises a meter lighting.

3. The vehicle according to claim 2, wherein controlling the transition of the interior equipment from one state to another state includes adjusting at least one of an angle of a seatback of the seat, a position of the steering wheel, and a level of illuminance of the lighting, the controller is further configured to adjust the at least one of the angle of the seatback of the seat, the position of the steering wheel, and the level of illuminance of the lighting at a first speed upon determining that the travel mode has transitioned to the sports mode, and the controller is further configured to adjust the at least one of the angle of the seatback of the seat, the position of the steering wheel, and the level of illuminance of the lighting at a second speed, slower than the first speed, upon determining that the travel mode has transitioned to the relaxation mode.

4. The vehicle according to claim 1, wherein the mode transition determination unit is configured to determine whether the transition has occurred in response to an input indicating a switching instruction for the transition from an occupant of the vehicle to the vehicle, the interior equipment comprises a meter lighting, and the transition of the interior equipment from the current state to the post-transition state includes a change in an angle of a seatback of the seat relative to the vehicle, a change in a color of the meter lighting, a change in a position of the steering wheel relative to the vehicle, or a change in the illuminance of the lighting.

5. A vehicle having (1) driving modes comprising an automated driving mode and a manual driving mode and (2) travel modes comprising a normal mode and a sports mode, the vehicle comprising:

interior equipment configured to change a state in accordance with a selected one of the driving modes or a selected one of the travel modes; and a circuitry configured to:

determine whether a transition has occurred from one of the driving modes to another of the driving modes, from one of the travel modes to another of the travel modes, or from both;

in response to determining that the transition has occurred, set a post-transition state of the interior equipment associated with a post-transition driving mode, a post-transition travel mode, or both, and set a transition speed based on the post-transition driving mode, the post-transition travel mode, or both; and control the interior equipment to transition from a current state to the set post-transition state at the set transition speed;

wherein the travel modes further comprise a mode other than the normal mode and the sports mode, the interior equipment comprises a seat, lighting, and a steering wheel which are provided in a vehicle interior, and a controller configured to:

control the interior equipment to change, at a higher speed than a normal speed, an angle of a seatback of the seat, a position of the steering wheel relative to the vehicle, and a level of illuminance of the lighting upon determining that the travel mode has transitioned from the normal mode to the sports mode; and control the interior equipment to change, at a lower speed than the normal speed, the angle of the seatback of the seat, the position of the steering wheel, and the level of illuminance of the lighting, upon determining that the travel mode has transitioned from the normal mode to the mode other than the normal mode and the sports mode.

6. The vehicle according to claim 5, wherein the travel modes further comprise a relaxation mode, and the interior equipment comprises a meter lighting.

7. The vehicle according to claim 6, wherein controlling the transition of the interior equipment from one state to another state includes adjusting at least one of an angle of a seatback of the seat, a position of the steering wheel, and a level of illuminance of the lighting, the controller is further configured to adjust the at least one of the angle of the seatback of the seat, the position of the steering wheel, and the level of illuminance of the lighting at a first speed upon determining that the travel mode has transitioned to the sports mode, and the controller is further configured to adjust the at least one of the angle of the seatback of the seat, the position of the steering wheel, and the level of illuminance of the lighting at a second speed, slower than the first speed, upon determining that the travel mode has transitioned to the relaxation mode.

8. The vehicle according to claim 5, wherein
the circuitry is further configured to determine whether the transition has occurred in response to an input indicating a switching instruction for the transition from an occupant of the vehicle to the vehicle,
the interior equipment comprises, a meter lighting, and
the transition of the interior equipment from the current state to the post-transition state includes a change in an angle of a seatback of the seat relative to the vehicle, a change in a color of the meter lighting, a change in a position of the steering wheel relative to the vehicle, or a change in the illuminance of the lighting.

* * * * *